(No Model.)

F. G. ABBEY & J. G. McLEOD.
STEEL TRAP.

No. 591,264.  Patented Oct. 5, 1897.

Witnesses
Lee J. Van Horn.
Victor J. Evans.

Inventor
Fred G. Abbey
John G. McLeod,

By John Wedderburn Attorney

UNITED STATES PATENT OFFICE.

FRED G. ABBEY AND JOHN G. McLEOD, OF LOOKOUT, WASHINGTON.

STEEL TRAP.

SPECIFICATION forming part of Letters Patent No. 591,264, dated October 5, 1897.

Application filed May 11, 1897. Serial No. 635,998. (No model.)

*To all whom it may concern:*

Be it known that we, FRED G. ABBEY and JOHN G. McLEOD, residing at Lookout, in the county of Skagit and State of Washington, have invented certain new and useful Improvements in Steel Traps; and we do hereby declare the following to be a full, clear, and exact description of the invention, such as will enable others skilled in the art to which it appertains to make and use the same.

This invention relates to steel traps; and it consists, essentially, of making a pan and bed-support therefor independent of the trap proper for application to either side thereof.

The object of the invention is to provide an animal-trap which will be more sensitive than those now commonly employed and take a firm hold on an animal caught thereby and avoid release by pulling or gnawing, as will be readily understood.

Figure 1:
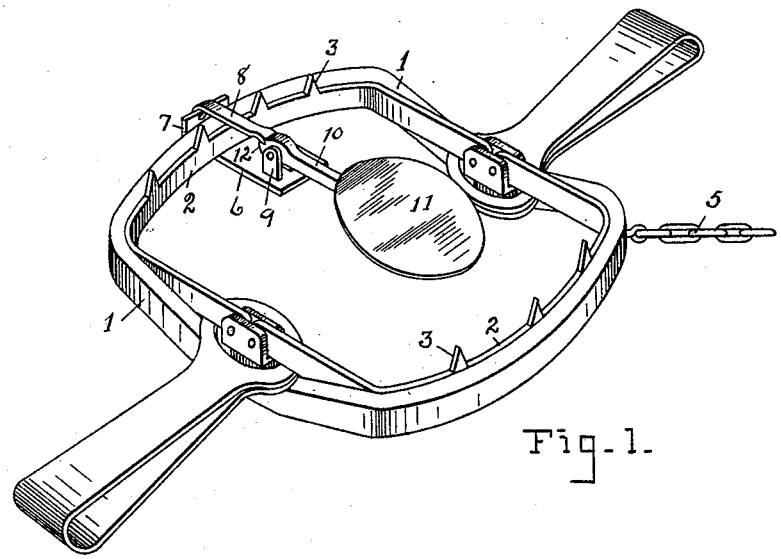
Figure 2:
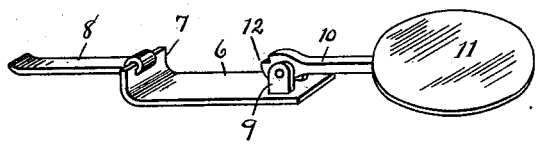

In the accompanying drawings, Figure 1 is a perspective view of a trap, showing the improved pan and bed-support therefor applied thereto. Fig. 2 is a detail perspective view of the improved attachment.

Referring to the drawings, wherein similar numerals of reference are employed to indicate corresponding parts in the views, the numeral 1 designates the bed or support of the entire trap, having pivoted thereto oppositely-disposed jaws 2, provided with suitable teeth 3, and coacting at their pivotal points with the usual form of spring-arms operating after the trap is set to close the jaws when the latter are released. A chain or other fastening device 5 is adapted to be applied to the bed or support 1 to secure the trap at a suitable point and prevent removal thereof by dragging or other means.

The improvement consists in forming a bed or support 6, having a turned-up end 7, to which is pivotally attached a trigger 8, and rising from the said bed or support 6, near the opposite end, is a post 9, to which is pivotally attached an arm 10 of a pan 11. The said arm 10, adjacent its pivotal connection with the post 9 and on the upper surface thereof, is formed with a shoulder 12, which is adapted to be engaged by the trigger 8 in a well-known manner. This construction of bed-support and pan, together with the trigger, is entirely independent of the remaining part of the trap, and the said bed or support 6 is flat and lies in a horizontal plane, except the end 7 thereof, which is turned up to properly receive and position the trigger 8.

In operation the jaws 2 are opened, as shown in Fig. 1, the bed or support 6 having been first inserted under the bed or support 1, and the trigger is then moved over the adjacent jaw and caught in the shoulder 12.

By means of the construction shown the trap is made extremely sensitive, and when set in the position shown in Fig. 1 is embedded in a hole in the ground corresponding in diametrical extent to the degree of spread of the paws of large animals, and when one of the latter, either walking or running, strikes the pan his leg goes into the hole full length, and the trap engages said leg high up at a fleshy point where the teeth of the jaws can take a firm hold and securement.

It will be seen that the base or support 1 is entirely open on the interior, in view of the independent structure and arrangement of the band and trigger, and permits the leg of an animal being trapped to pass through the jaws without impediment. When an animal is caught by the trap, as set forth, the pan and its support, together with the trigger, become disconnected from the trap and are not injured, but will be found adjacent thereto in resetting.

In traps now commonly employed the animals held thereby frequently release themselves by gnawing their legs, or, owing to a very insecure engagement of the traps, they can easily pull away or loosen themselves, but by the use of the trap set forth this is avoided, in view of the fact that the animal is caught high up on the leg, at a full fleshy portion thereof, where it is impossible to gnaw through.

Another great advantage of the present form of trap resides in its application to either side or in connection with either jaw.

It is obviously apparent that many minor changes in the details of construction might be made and substituted for those shown and described without in the least departing from the nature or spirit of the invention.

Having thus described the invention, what is claimed as new is—

In a trap, the combination of a support or bed having a clear opening in the center thereof, spring-actuated jaws mounted on said support or bed, and an independent pan and trigger adapted to be applied to either side of said trap, substantially as and for the purpose specified.

In testimony whereof we have signed this specification in the presence of two subscribing witnesses.

FRED G. ABBEY.
JOHN G. McLEOD.

Witnesses:
T. T. NICKLE,
W. E. TAGGERT.